(No Model.)  8 Sheets—Sheet 1.

E. MEIER & H. A. LANDMAN.
ADDRESSING MACHINE.

No. 549,382.  Patented Nov. 5, 1895.

WITNESSES:

INVENTORS
E. Meier
H. A. Landman
BY Munn & Co.
ATTORNEYS.

(No Model.) 8 Sheets—Sheet 2.

E. MEIER & H. A. LANDMAN.
ADDRESSING MACHINE.

No. 549,382. Patented Nov. 5, 1895.

WITNESSES:

INVENTORS (No Model.) 8 Sheets—Sheet 3.
E. MEIER & H. A. LANDMAN.
ADDRESSING MACHINE.
No. 549,382. Patented Nov. 5, 1895.
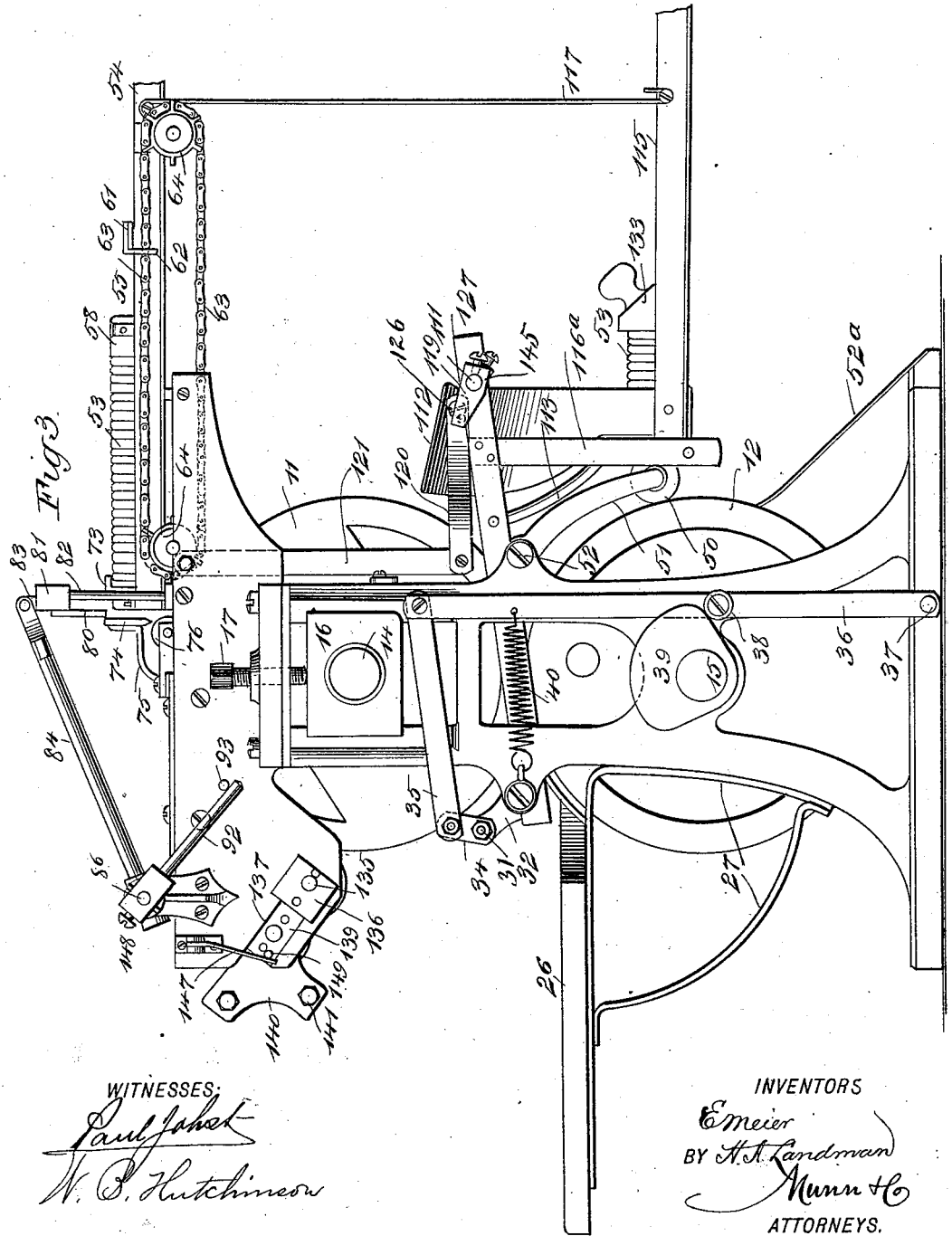

(No Model.) 8 Sheets—Sheet 4.
E. MEIER & H. A. LANDMAN.
ADDRESSING MACHINE.
No. 549,382. Patented Nov. 5, 1895.
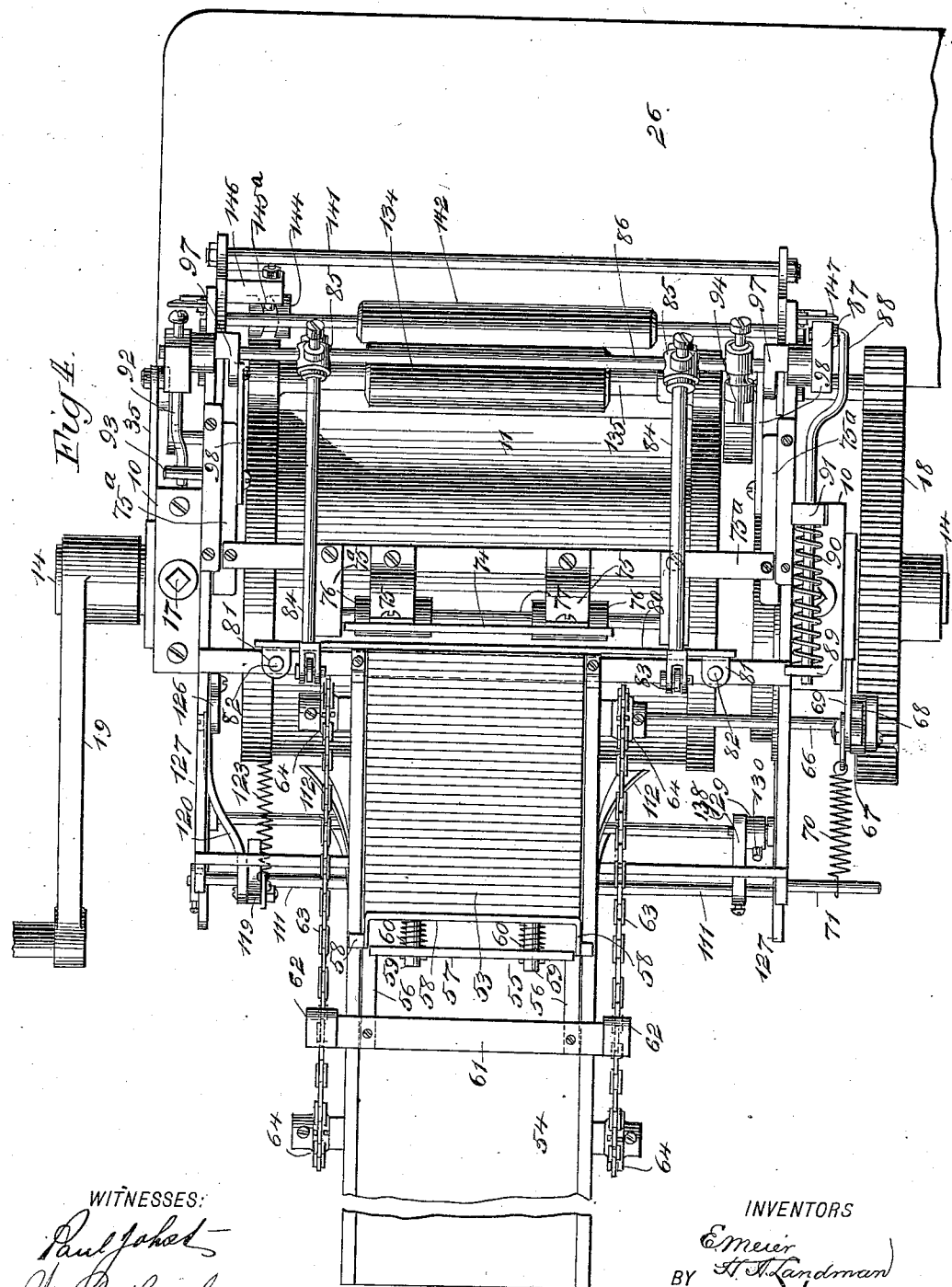
WITNESSES:
Paul Jahret
W. B. Hutchinson
INVENTORS
E. Meier
H. A. Landman
BY
Munn & Co
ATTORNEYS.

(No Model.)
8 Sheets—Sheet 5.
E. MEIER & H. A. LANDMAN.
ADDRESSING MACHINE.
No. 549,382. Patented Nov. 5, 1895.
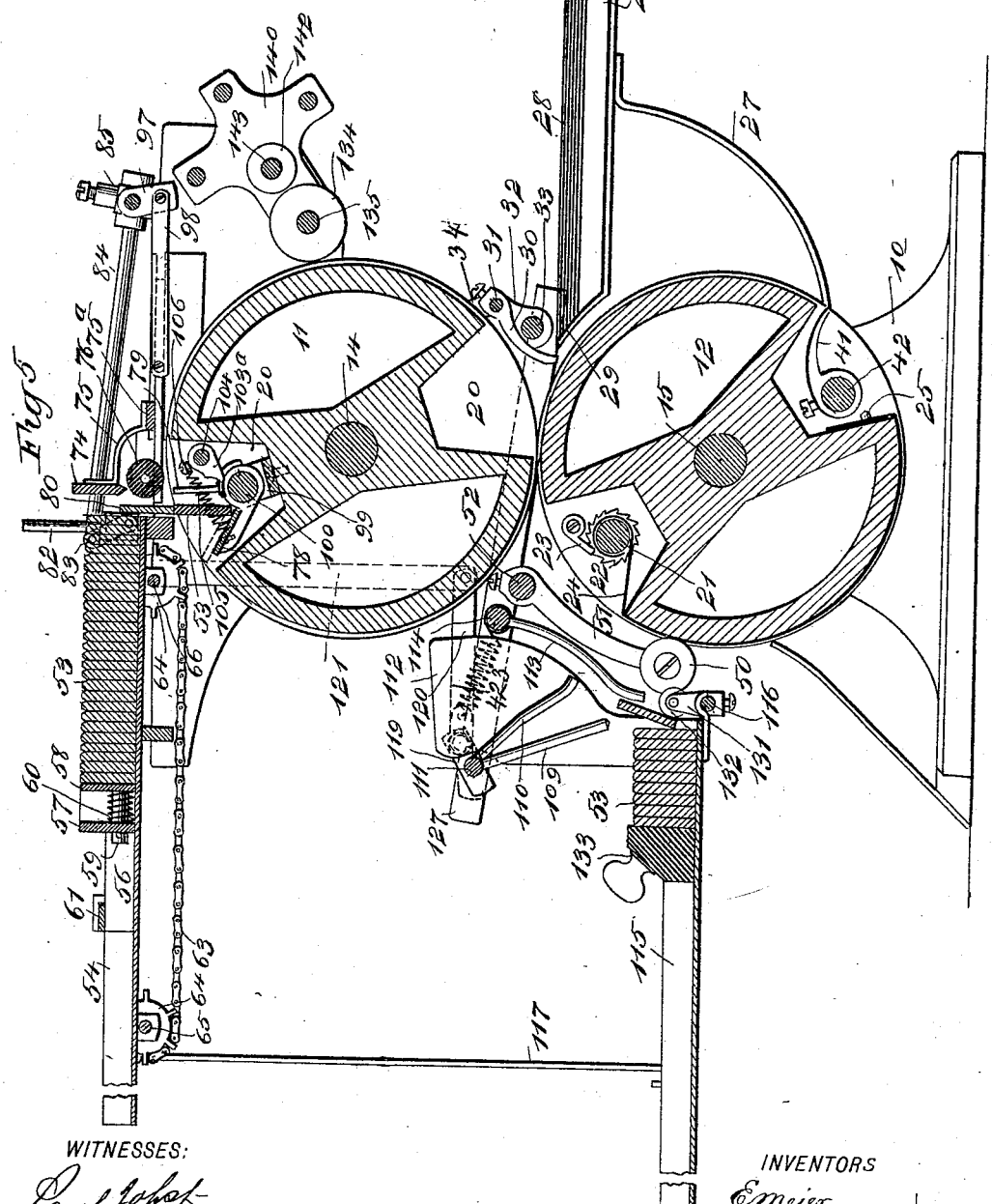
WITNESSES:
Paul Johst
W. P. Hutchinson
INVENTORS
E. Meier
H. A. Landman
BY Munn & Co
ATTORNEYS.

(No Model.)   8 Sheets—Sheet 6.
E. MEIER & H. A. LANDMAN.
ADDRESSING MACHINE.
No. 549,382. Patented Nov. 5, 1895.
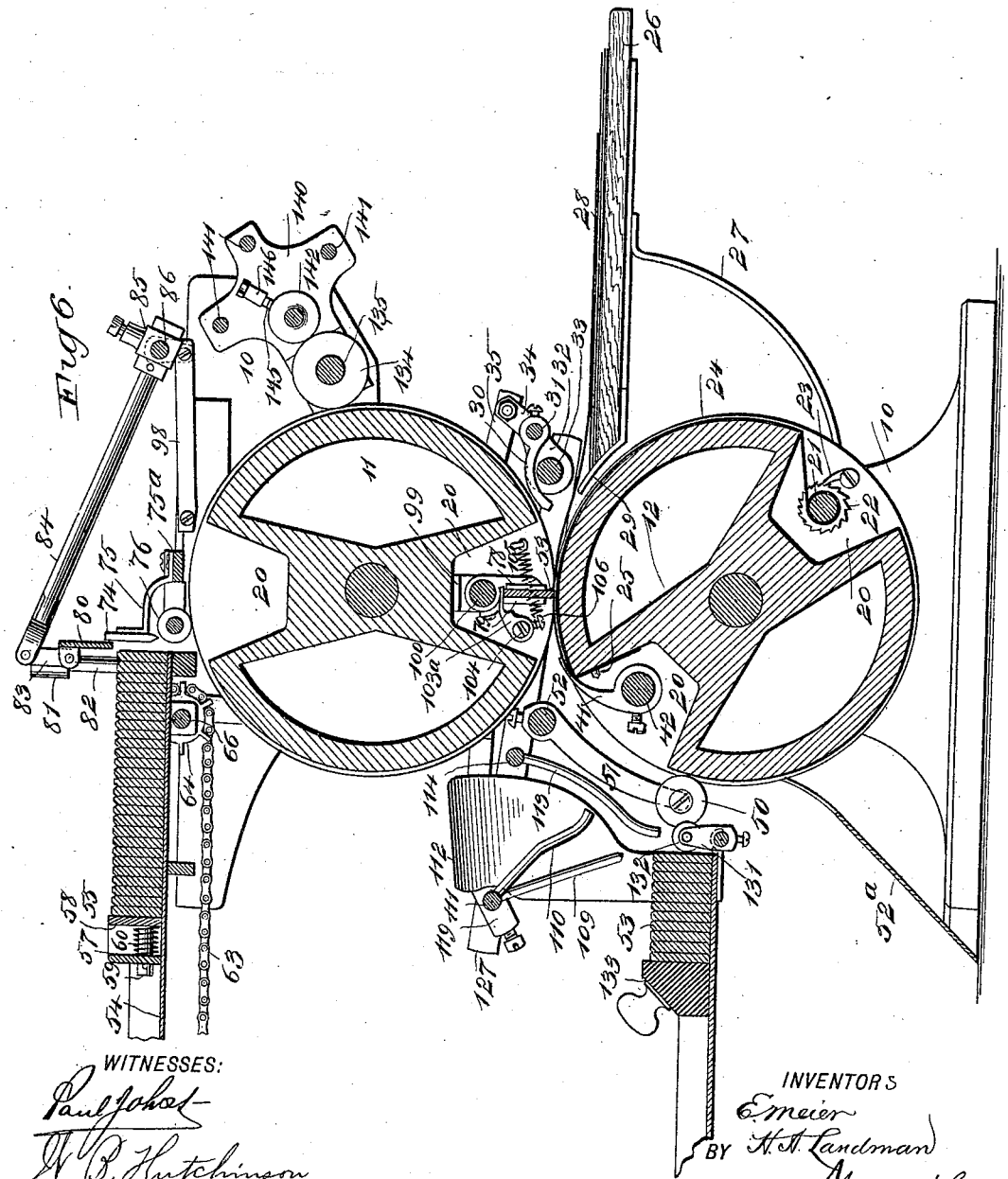

(No Model.)  8 Sheets—Sheet 7.
E. MEIER & H. A. LANDMAN.
ADDRESSING MACHINE.
No. 549,382.  Patented Nov. 5, 1895.
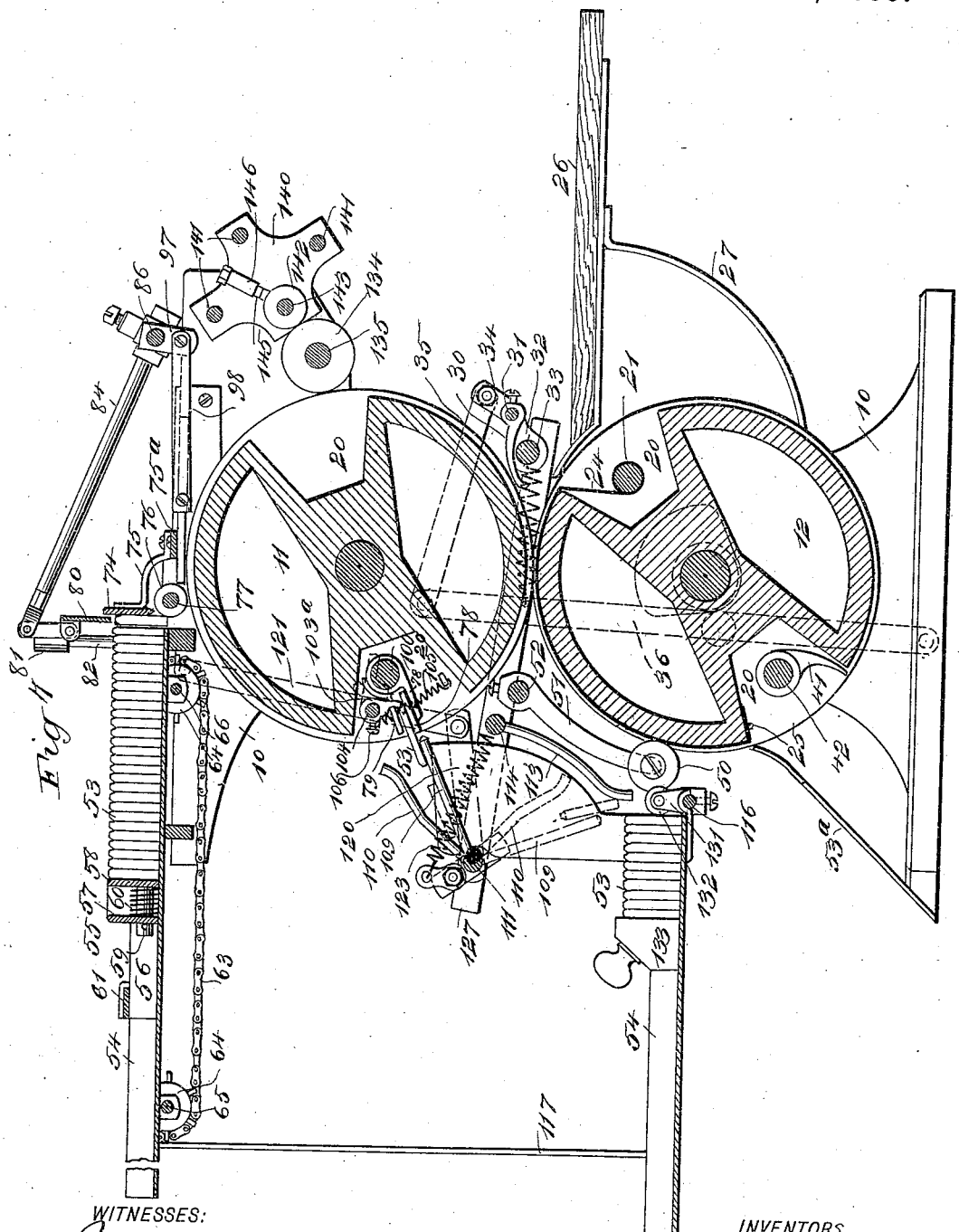
WITNESSES:
INVENTORS
E. Meier
BY H. A. Landman
Munn & Co.
ATTORNEYS.

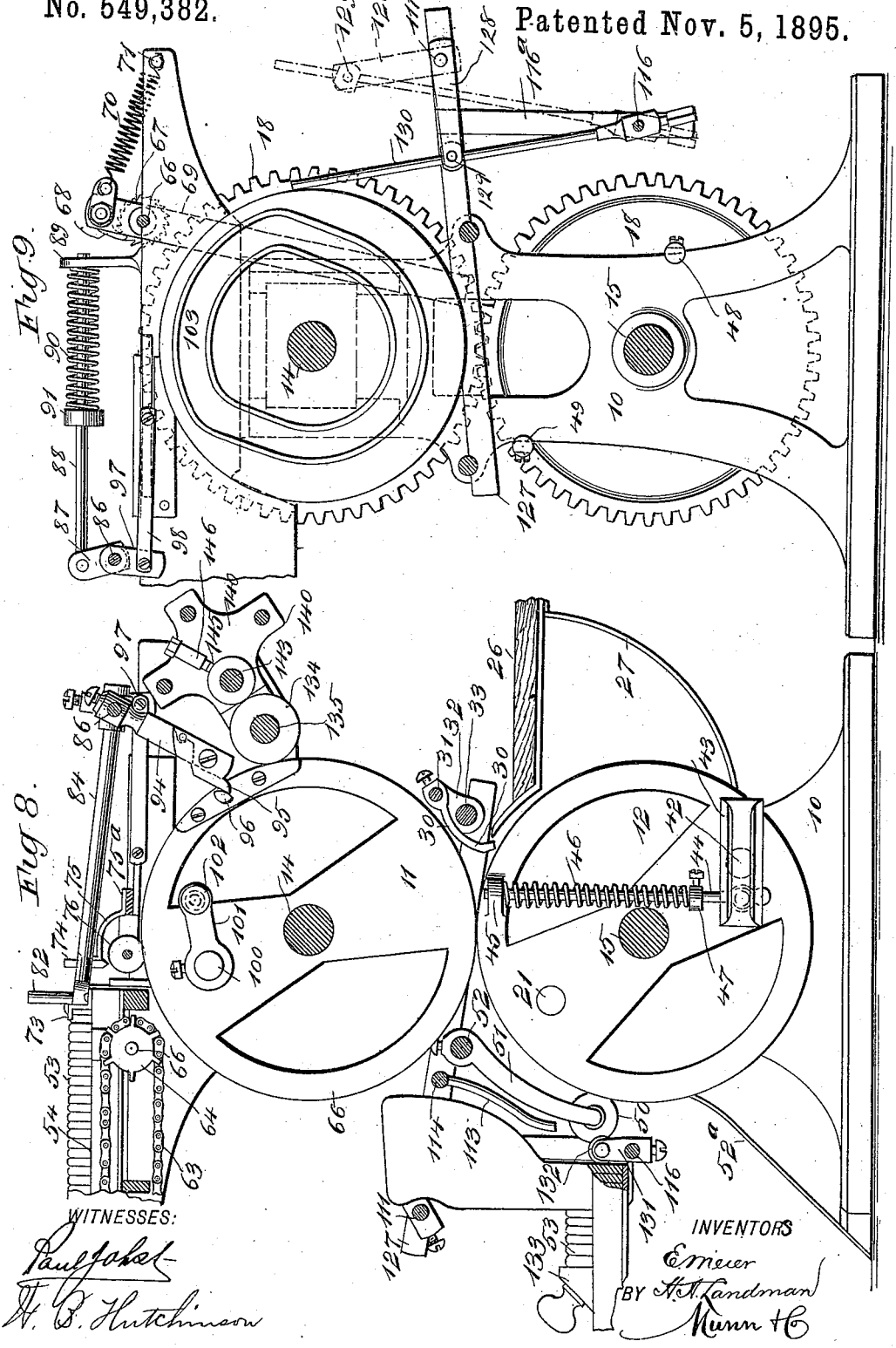

UNITED STATES PATENT OFFICE.

EMIL MEIER AND HENRY A. LANDMAN, OF BROOKLYN, NEW YORK.

ADDRESSING-MACHINE.

SPECIFICATION forming part of Letters Patent No. 549,382, dated November 5, 1895.

Application filed May 17, 1894. Serial No. 511,581. (No model.)

*To all whom it may concern:*

Be it known that we, EMIL MEIER and HENRY A. LANDMAN, of Brooklyn, in the county of Kings and State of New York, have invented a new and Improved Addressing-Machine, of which the following is a full, clear, and exact description.

Our invention relates to improvements in that class of machines which are adapted to print from linotypes; and the object of our invention is to produce an efficient machine of this character which is especially adapted for use in printing envelopes, wrappers, or other articles on which addresses are usually written, although the machine may be used for printing anything capable of being printed with linotypes; to provide an efficient gripping mechanism for holding linotypes while they are being used for printing; to provide a simple feed mechanism for carrying the envelopes or other matter through the machine; to provide an automatic feed to deliver the linotypes successively to the grippers on the printing-cylinder; to provide an efficient means for ejecting the linotypes after they have been used, and in general to produce a machine which automatically fits and discharges the linotypes and is adapted to print rapidly and well.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
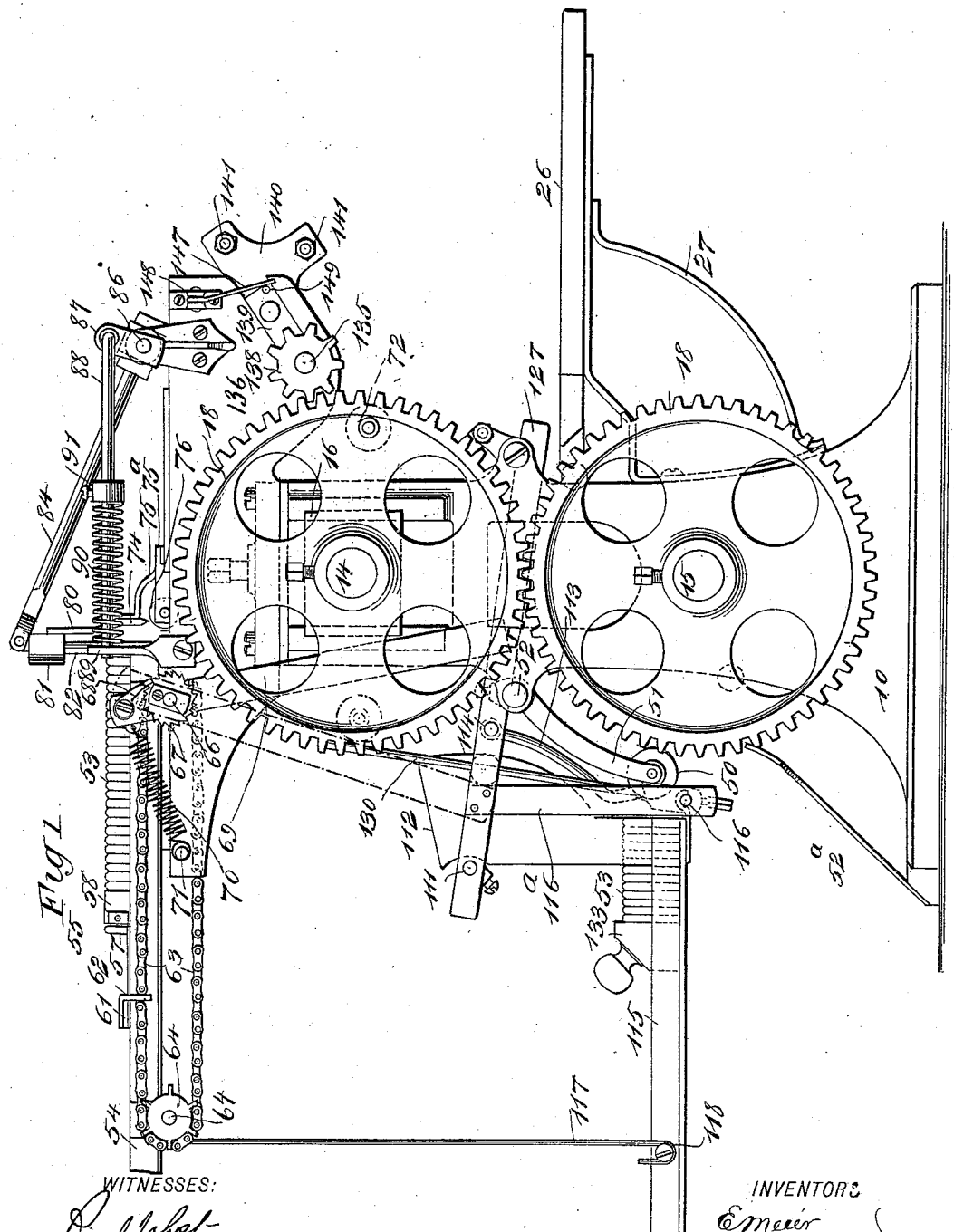
Figure 2:
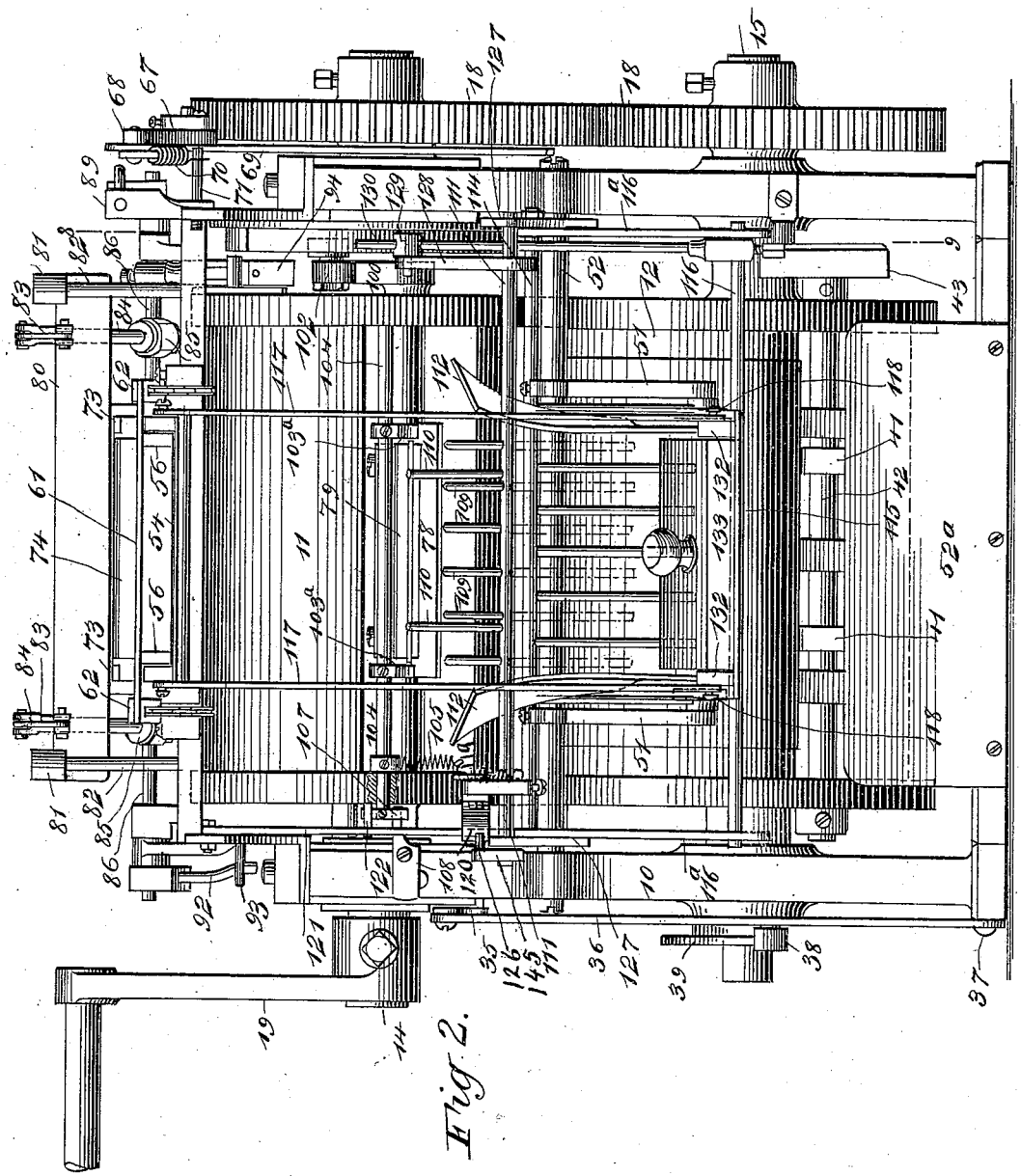

Figure 1 is a side elevation of the machine embodying our invention. Fig. 2 is a rear elevation of the machine. Fig. 3 is a side elevation taken from the opposite side to that shown in Fig. 1. Fig. 4 is a plan view of the machine. Fig. 5 is a central vertical section showing the position of the machine as a linotype is being delivered to the grippers of the printing-cylinder. Fig. 6 is a similar section showing the second position of the machine with the linotype in the act of printing. Fig. 7 is a similar section to that shown in Figs. 5 and 6, but illustrates the third position of the machine in which the linotype, after having printed on the paper, is being discharged into its depositing-receiver. Fig. 8 is a broken vertical section on the line 8 9 of Fig. 2, looking toward the cylinders of the machine; and Fig. 9 is a similar section, but looking in the opposite direction.

The machine is provided with a suitable frame 10, in which are journaled cylinders 11 and 12, these being placed one above the other, the upper cylinder 11 serving as the printing-cylinder and the lower one 12 as the impression-cylinder, and the shafts 14 and 15 of these cylinders are journaled in the frame, the upper shaft 14 being journaled in vertically-adjustable boxes 16, which are held down by screws 17 in the customary way, and thus the cylinders may also be held in proper relation. On the shafts 14 and 15 are gear-wheels 18, which are of the same size and which mesh together, so that the cylinders have a similar and simultaneous movement. The shaft 14 is provided with a crank 19, by which the shaft may be turned and the machine operated, but it will, of course, be understood that a pulley may be substituted for the crank.

The cylinders 11 and 12 are provided on diametrically-opposite sides with longitudinal recesses 20 to provide for the gripping and other mechanism hereinafter described, although in the upper cylinder but one of these recesses is utilized. As above remarked, the lower cylinder serves as the impression-cylinder, and extending longitudinally through one of its recesses 20 is a shaft 21, which is provided with a ratchet-wheel 22 and a pawl 23 to keep the shaft from turning back, and to the shaft is secured one end of a web 24 of fabric, which extends over one side of the cylinder and is at its other end made fast in the opposite recess 20, as shown at 25. The web is used to make a suitable surface for printing.

The machine has on one side a table 26, which is preferably removable, and which is supported by brackets 27, and is adapted to carry the envelopes or other material 28 (see Fig. 5) to be printed. The table has at its inner end upwardly and inwardly projecting fingers 29, which serve as guides for the envelopes, and as the envelopes are pushed inward the upper one strikes against the limiting-fingers 30 on the shaft 31 near the top level of the lower cylinder, the shaft being carried by crank-arms 32, which are pivoted on the cross-shaft 33, which is rigid in the machine-frame, and the shaft 31 is provided at one end with a crank 34, which connects by means of a pitman 35 with a swinging lever 36, (see Fig. 3,) which is fulcrumed at the bottom, as shown at 37, and is provided with a roller 38, adapted to travel on the cam 39, which is secured to the shaft 15, the lever being pulled by a spring 40, so as to hold the roller in close contact with the cam, and it will be observed that at each revolution of the shaft 15 the cam will allow the spring 40 to move the lever 36 and swing the arms 32 and shaft 31 so as to raise the fingers 30 and permit an envelope to be fed to the lower cylinder 12, the cam 39 being so placed that this movement takes place at the moment that the gripping-fingers 41 (see Figs. 5 to 7) are in position to bind the inner edge of the envelope to the face of the cylinder. The continued movement of the cam 39 moves back the lever 36 against the tension of the spring 40 and actuates the pitman 35, crank 34, and swings the arms 32 and shaft 31 so as to bring the fingers 30 back into position to meet the inner edges of the envelopes 28, as shown in Fig. 5. The spring 40, acting on the lever 36 in one direction and the cam 39 in the other, serves to impart a steady movement to the lever and the parts connected therewith and operated thereby.

The fingers 41 are held in the recess 20 opposite that in which the shaft 21 is located, and the fingers are carried by a shaft 42, which is journaled in the end walls of the cylinder, the shaft having at one end a longitudinally-slotted crank 43, which is provided with an arm 44, extending tangentially across one end of the cylinder and held in a suitable support 45, the shaft being provided with a spiral spring 46, which is arranged between the lug or support 45 and a collar 47 on the shaft, and the pressure of which spring serves to hold the gripping-fingers 41 against the face of the lower cylinder 12, as shown in Fig. 6.

The frame 10 has on its inner side, and in the path of the crank 43, studs 48 and 49, (see Fig. 9,) which by entering the slot in the crank actuated the same so as to move it against the tension of the spring 46 and thus open the fingers 41 to receive or discharge an envelope or other thing. The envelopes or other things which are being printed pass beneath rollers 50 of substantially the usual kind, which ride on the back side of the cylinder and are journaled in pendent arms 50 on a cross-shaft 52. (See Figs. 5 to 7.) The envelopes are delivered upon a guide 52ª at the back of the machine.

The linotypes 53 are used in printing, these being of substantially the usual kind, comprising a sheet of type-metal, on the face of which the type is struck up, and to enable them to be accurately and successively delivered to the printing-cylinder they are carried in a feed trough or table 54, which is arranged near the top of the cylinder 11 and at the back side of the machine, and they are fed forward to the machine by a follower 55, which is provided with slide-bars 56, (see Fig. 4,) adapted to move along the table bottom near opposite sides thereof, a cross-bar 57, secured to the slide-bars, a buffer-plate 58 in front of the cross-bar, the plate having rearwardly-bent ends to ride on the sides of the feed table or trough, guide-pins 59, projecting from the buffer-plate through the cross-bar 57, and springs 60, serving as backings for the buffer-plate. It is the buffer-plate which comes in contact with the linotypes, and this affords a yielding backing, so that it cannot crowd the linotypes into the machine too rapidly, and, moreover, this buffer-plate first comes in contact with the stops at the end of the feed trough or table, as hereinafter described, and by yielding prevents any damage from ensuing.

The follower 55 has a top cross-bar 61, which extends across the table or feed-trough, and at the ends of this are depending arms 62, which engage the endless feed-chains 63 on opposite sides of the table, and by means of these chains the follower is fed inward, so as to slide along the linotypes. The connection between the arms 62 and the chains 63 is a loose one, so that the follower can be lifted off the table and moved back to its original position. The feed-chains are carried by sprocket-wheels 64, which are secured to shafts 65 and 66, journaled beneath the feed trough or table near the outer or inner ends thereof, the shaft 66 having at one end a ratchet-wheel 67, which is engaged by a pawl 68 on the lever 69, this being journaled on the shaft 66 and pulled by a spring 70, which is attached to a stud 71, (see Fig. 4,) so as to draw back the pawl on the ratchet-wheel.

The lever 69 extends into the path of a roller 72 on the upper gear-wheel 18, and thus at each revolution of the gear-wheel and its cylinder the lever 69 is moved and the ratchet-wheel 67 and shaft 66 turned so as to move the feed-chains 63 and the follower 55, so as to force a linotype 53 into position to drop into the jaws of the gripper on the printing-cylinder, as hereinafter described. In case there are no linotypes in front of the follower it brings up against the stops 73, which engage the ends of the buffer-plate 58.

Directly in front of the feed trough or table 54, and at a point above where the linotypes are dropped, is an abutment-plate 74, carried by arms 75, which are secured to a carriage 75ª, having a slight rearward movement, as hereinafter specified, and this carriage also supports rollers 76, which are arranged beneath the plate 74 and on a shaft 77, so as to assist in guiding the linotypes to the printing-jaws 78 and 79, these being arranged in one of the recesses 20 of the cylinder 11 and operated in the manner to be hereinafter described.

The linotypes are successively pushed down past the abutment-plates 74 and rollers 76 into the jaws by a push-plate 80, which is arranged edgewise above and a little behind the abutment-plate 74, so that when depressed it will strike square on the upper edge of a linotype, this plate having guide-sleeves 81 thereon, which move on guide-posts 82, erected on the frame of the machine at opposite ends thereof. The push-plate 80 is connected by links 83 with actuating-arms 84, which are secured, as shown 85, to a cross-shaft 86 on the top front portion of the machine, and this shaft is provided with a crank 87, connecting with a rearwardly-extending rod 88, which is mounted in a support 89, (see Fig. 1,) and has on it a spiral spring 90, arranged between the support 89 and a collar 91 on the rod, the tension of the spring being such as to normally tilt the shaft and raise the push-plate 80.

On the opposite end of the shaft 86 is an arm 92, which, by engaging a stud 93 on the machine-frame (see Figs. 2 and 4) prevents the shaft from lifting too much and the push-plate from being raised too high. The shaft is also provided with a depending arm 94, (see Fig. 8,) which has at its lower end a striking-plate 95, this being extended into the path of a stud 96, which is secured to the cylinder 11, and thus at each revolution of the cylinder the striking-plate is hit by the stud and the shaft 86 is tilted and the arms 84 moved down, so as to carry down the push-plate 80, and this pushes down one of the linotypes 53 which at this moment is beneath it and carries the said linotype into the open jaws 78 and 79 of the cylinder 11. The shaft 86 has also depending cranks 97, which connec tby means of arms 98 with the carriage 75ª, and thus at the time a linotype is pushed against the abutment-plate 74 and crowded down opposite the rollers 76 the carriage recedes so as to permit the easy passage of the linotype. The movement of the carriage is, however, very slight.

The linotype-gripper comprises the two jaws 78 and 79 and their means of actuation, the jaw 79 being secured to a fixed support 99, which is fastened rigidly in the bottom of one of the recesses 20, and the jaw 78 is fastened to the shaft 100, which is journaled in the end walls of the cylinder 11 and has at one end a crank-arm 101, (see Fig. 8,) on which is a roller 102, which is adapted to run in the cam-groove 103 of a stationary plate secured to the frame of the machine, (see Fig. 9,) this groove being shaped in such a way that it holds the jaws closed, except when they are beneath the push-plate 80 ready to receive a linotype and when they are in position to discharge the same, as described below.

When a linotype is dropped between the jaws, its inner edge strikes on the ejecting-arms 103ª, which are fastened to a cross shaft or rod 104, which is journaled in the recess 20 parallel with the jaws, and these ejectors are held back by means of a spiral spring 105, which is secured to the cylinder and to a screw 106 or equivalent stud on the shaft. (See Figs. 5 to 7.) The shaft 104 has at one end (see Fig. 2) a crank 107, which is adapted to engage an arm 108 on the frame 10, and consequently when the crank 107 strikes this arm the shaft 104 is tilted against the tension of the spring 105 and the ejecting-arms 103ª are thrown out, thus discharging the linotype against which they bear and delivering it into the depositing-receiver, comprising the arms 109 and 110, which are arranged in converging rows (see Figs. 5 to 7) and are carried by a shaft 111, and these arms are adapted to swing from the position shown in Fig. 7, in which position they receive the linotype, to the position shown in Fig. 5, at which point they discharge it.

The depositing-receiver swings between the vertical guide-plates 112, which are curved outward slightly, as shown in Fig. 2, and which are held stationary, so as to prevent the linotype from swinging endwise from the depositing-receiver. The linotypes are prevented from being thrown too quickly from the receiver by the curved guide-rods 113, which are secured to the cross-shaft 114, (see Figs. 5 to 7,) and which are arranged at a point below where the linotype is discharged and between the inner end of the receiver and the lower cylinder. The linotypes are discharged from the receiver upon a table 115, which at its inner end is pivoted to a cross-shaft 116, held in supporting-brackets 116ª, hanging from the supporting-bars 127, hereinafter referred to, and at its outer end a table 115 is supported by hooks 117, dropped from the upper feed table or trough 54, and engaging studs 118 on the sides of the table 115.

The shaft 111, which carries the depositing-receiver, is provided with a crank 119, (see Figs. 5 to 7 and also Fig. 2,) which connects by a pitman 120 with a lever 121, which is fulcrumed near the top of the machine (see Fig. 3) and extends into the path of a stud 122 (see Fig. 2) on the end of the cylinder 11, and consequently at each revolution of the cylinder the stud strikes the lever 121 and tilts the shaft 111 and the depositing-receiver in the manner heretofore described. The depositing-receiver is held normally down by the spring 123, (see Fig. 4,) which is secured to the crank 119 on the shaft 111 and extends to the shaft 114 or equivalent fastening.

The shaft 111 is prevented from tipping down too far by an arm 145, which is attached to it, and which has a stud 126 thereon which strikes against one of the supporting-bars 27, which are arranged at opposite ends of the machine and form supports for the shafts 111 and 114. The shaft 111 is also provided with a crank 128, which has at one end a perforated roller 129, (see Fig. 2,) through which projects and slides freely the rod 130, which extends downward and is fastened to the shaft 116, which shaft is arranged at the inner end of the table 115, and the shaft 116 carries upwardly-extending arms 131 with rollers 132 thereon, so that when the shaft 111 is tilted and a linotype discharged the connections just described tilt the shaft 116 and arms 131, thus pushing the rollers 132 against the linotype and moving the linotype back along the table 115, on which is placed a block 133, which prevents the linotypes from being pushed over.

The ink is applied to the linotype by an inking-roller 134, which is carried by a shaft 135 on the front side of the cylinder 11, the shaft being journaled in plates 136, held in the end portions of the frame 10 at the foot of the diagonal slots 137, in which the slide 139 of the frame 140 is held, this frame comprising two opposite end-pieces connected by cross-rods 141.

The shaft 135 has at one end a pinion 138, (see Fig. 1,) meshing with one of the gear-wheels 18, so that in this way the inking-roller is turned. Behind the inking-roller and running upon it in the customary manner is the distributing-roller 142, the shaft 143 of which is journaled in the frame 140, and this shaft is movable endwise, as well as being revoluble, and has thereon a cam-wheel 144, (see Fig. 4,) the groove of which engages a stud 145, held in a support 146 in the frame 10, and thus as the shaft 143 revolves the stud and cam move to endwise and cause the ink to be evenly distributed on the roller 134. The frame 140 is removable, and it is held in place by outwardly-swinging latches 147, (see Figs. 1 and 3,) which latches are pivoted, as shown at 148, at their upper ends and are adapted to engage studs 149 on the frame 140. It will be seen that when a little ink is applied to the roller 142 it will be evenly distributed on the roller 134 and applied to the linotypes as they pass opposite the roller 134.

It will be seen from the above description, without following out the operation in detail, that the linotypes are successively fed to the gripping-jaws of the printing-cylinder, each plate being held first between its follower and the abutment-plate 74 and then pushed into position between the jaws; that the envelopes or other things to be printed are nicely fed through the machine and discharged therefrom; that the printing is rapidly done, and that each linotype, when used, is delivered upon the table 115, where the linotypes may be quickly taken up and rearranged for use.

Having thus described our invention, we claim as new and desire to secure by Letters Patent—

1. A machine of the kind described, comprising a longitudinally recessed rotatable printing cylinder, a pair of linotype gripping jaws arranged in the cylinder and adapted to hold a linotype so that its edge will project beyond the face of the cylinder, and mechanism for opening and closing the jaws by the rotation of the cylinder, substantially as described.

2. A machine of the kind described, comprising a printing cylinder carrying a pair of jaws of which one is pivoted to the cylinder, a device for feeding linotypes to the said jaws, means for opening and closing the jaws, a chute on which the linotypes are discharged and a suitable support for the material to be printed upon, substantially as described.

3. The combination of the rotary printing cylinder, the fixed jaw secured thereto, the movable jaw pivotally connected with the cylinder, automatic mechanism for opening and closing the movable jaw and a suitable support for the material to be printed upon, substantially as described.

4. The combination of a support for the material to be printed upon, a rotary printing cylinder, a pair of type-holding jaws in the said cylinder, means for opening and closing the jaws, an ejector for pushing the types out from between the jaws, and means for operating the said ejector by the turning of the cylinder, substantially as described.

5. The combination of a support for the material to be printed upon, a rotary printing cylinder having a longitudinal recess, a pair of jaws disposed essentially radially in the said recess, and adapted to engage opposite side faces of a linotype, means for opening and closing the jaws, a shaft journaled in the recess of the cylinder and carrying ejector fingers adapted to engage the inner end of the linotype and force the same outward when the jaws open, and means for operating the said shaft, substantially as described.

6. The combination, with the printing cylinder and the linotype-holding jaws therein, of the feed table arranged adjacent to the upper part of the cylinder, a follower on the table, means for moving the follower toward the cylinder to bring the linotypes over the jaws into essentially vertical alignment therewith, a device for moving the linotypes downward to convey them between the jaws, substantially as described.

7. The combination, with the printing cylinder and the linotype-holding jaws therein, of the feed table arranged adjacent to the upper part of the cylinder so that the jaws will come directly below the inner end of the table during the rotation of the cylinder, a follower having guided movement on the table, a spring-pressed buffer plate secured to the follower and capable of yielding movement in the opposite direction to that of the feed, feed chains operatively connected with the cylinder to receive an intermittent motion therefrom, and arms projected from the follower and detachably connected with the feed chains, substantially as described.

8. The combination, with the printing cylinder and the grippers thereon, of the feed table above the cylinder, the follower on the table, the feed chains at the side of the table, the arms secured to the follower and connecting with the feed chains, sprocket wheels and shafts for carrying the feed chains, a swinging lever journaled on one of the shafts and connected by a ratchet wheel and pawl with the shaft, and means for swinging the lever by the movement of the cylinder, substantially as described.

9. The combination, with the printing cylinder and the grippers thereon, of the feed table above the cylinder, means for pushing linotypes off the table, an abutment plate near the inner end of the table, and a vertically movable push plate held adjacent to the abutment plate and above the table, substantially as described.

10. The combination, with the printing cylinder and the grippers thereon, of the feed table near the upper end of the cylinder, means for pushing linotypes off the table, the abutment plate held opposite the inner end of the table, guide rollers below the abutment plate and in essentially vertical alignment therewith and the vertically movable push plate above the inner end of the table, substantially as described.

11. The combination, with the printing cylinder and the grippers thereon, of the feed table, means for pushing linotypes off the inner end of the table, the movable carriage opposite the inner end of the table, and carrying stops, as the abutment plate and rollers, for the linotypes, and the vertically movable push plate adjacent to the stops and table, substantially as described.

12. The combination, with the printing cylinder carrying linotype-holding jaws, of a feed table adjacent to the upper part of the cylinder, a follower having guided movement on the said table, a movable abutment opposite the inner end of the table and means for causing the same to approach and recede from, the inner end of the table, and a push plate having movement between the inner end of the table and the said abutment, substantially as described.

13. The combination, with the printing cylinder carrying linotype-holding jaws, of a feed table adjacent to the upper part of the cylinder, a follower having guided movement on the said table, movable abutment opposite the inner end of the table and means for causing the same to approach, and recede from the inner end of the table, a push plate having guided movement between the inner end of the table and the said abutment, a spring for normally holding the push plate in an elevated position, above the level of the linotypes on the feed table, and means for periodically depressing the push plate against the tension of the spring, substantially as described.

14. The combination, with the printing cylinder and the grippers thereon, of the shaft held parallel with the grippers, the ejectors carried by the shaft and projecting near the inner edges of the grippers, a crank arm on the ejector shaft, and a tripping stud extending into the path of the crank arm, substantially as described.

15. The combination, with the printing cylinder and the linotype discharging mechanism thereon, of the oscillating receiver to catch the linotypes from the cylinder, the delivery table below the receiver, the outwardly-swinging arms opposite the inner end of the delivery table, and automatic mechanism for moving the arms, substantially as described.

16. The combination, with the printing cylinder and the linotype discharging mechanism thereon, of the tilting receiver for the discharged linotypes, the delivery table to which the receiver is adapted to convey the linotypes, a movable abutment at the end of the delivery table and means whereby the said abutment is operated at each oscillation of the receiver to push back the linotypes on the delivery table and to make room for the next linotype to be conveyed by the receiver, substantially as described.

17. The combination, with the printing cylinder and the linotype discharging mechanism thereon, of the tilting receiver for the discharged linotypes, the delivery table to which the receiver is adapted to convey the linotypes, arms pivoted adjacent to the end of the delivery table, and an operative connection between the said arms and the tilting receiver, substantially as described and for the purpose set forth.

18. The combination, with the tilting receiver, of the guide plates at the ends thereof, and the guide opposite the open side of the receiver, the latter guide comprising a cross rod and depending arms, substantially as described.

19. The combination, with the printing cylinder and the linotype discharging mechanism thereon, of the tilting receiver for the discharged linotypes, the delivery table to which the receiver is adapted to convey the linotypes, arms pivoted adjacent to the inner end of the delivery table, rollers carried by the said arms and adapted to engage and push back the linotypes on the delivery table, a crank on the shaft of the tilting receiver, and a rod connecting the said pivoted arms with the said crank, substantially as described.

20. The combination, with the printing cylinder provided with linotype-holding jaws and mechanism for opening and closing the same, of a feed table arranged adjacent to the upper end of the cylinder, a delivery table arranged in vertical alignment with the feed table and adjacent to the lower end of the cylinder, and a movable receiver to convey to the delivery table, the linotypes discharged from the cylinder, the receiver comprising an oscillating shaft with diverging arms thereon, substantially as described.

21. The combination, with the impression cylinder, of the feed table having guide fingers at its inner end, a cross shaft secured to the frame of the machine, swinging crank arms on the said cross shaft, a finger-carrying shaft carried by the crank arms to swing therewith, and a driving mechanism directly connected to the said finger-carrying shaft and crank arms to impart a rocking motion thereto, substantially as described.

22. The combination with the feed table, and means for forcing linotypes from off the table, of a movable carrier having a fixed jaw and a movable jaw, the jaws moving by the end of the table in proper time to receive the linotypes forced from the table, and automatic mechanism for opening and closing the movable jaw, substantially as described.

23. The combination with a feed table, and means for forcing linotypes successively from off the table, a movable carrier having a fixed jaw and a movable jaw, the jaws moving by the end of the table in proper time to receive the linotype forced from off the table, automatic mechanism for opening and closing the movable jaw, an inking roller, and an impression cylinder in contact with which the face of the linotype is carried by the movement of the carrier, substantially as described.

24. The combination of the rotary printing cylinder carrying a fixed jaw and a movable jaw adapted to receive between them a linotype, automatic means for opening and closing the movable jaw, an impression cylinder, a device for feeding linotypes to the said jaws and a receiver for the linotypes discharged from the jaws, substantially as described.

EMIL MEIER.
HENRY A. LANDMAN.

Witnesses:
LOUIS WEISS,
WILLIAM JOHN INGRAM.